United States Patent
Obie et al.

(10) Patent No.: US 10,656,693 B2
(45) Date of Patent: *May 19, 2020

(54) POWER MANAGEMENT CONTRACTS FOR ACCESSORY DEVICES

(71) Applicant: Microsoft Technology Licensing, LLC, Redmond, WA (US)

(72) Inventors: Gene Robert Obie, Clinton, WA (US); Heng Huang, Sammamish, WA (US); Yi He, Issaquah, WA (US); Duane Martin Evans, Snohomish, WA (US)

(73) Assignee: Micrsoft Technology Licensing, LLC, Redmond, WA (US)

( * ) Notice: Subject to any disclaimer, the term of this patent is extended or adjusted under 35 U.S.C. 154(b) by 147 days.

This patent is subject to a terminal disclaimer.

(21) Appl. No.: 15/871,765

(22) Filed: Jan. 15, 2018

(65) Prior Publication Data

US 2018/0136705 A1 May 17, 2018

Related U.S. Application Data

(63) Continuation of application No. 14/281,518, filed on May 19, 2014, now Pat. No. 9,874,914.

(51) Int. Cl.
*G06F 1/00* (2006.01)
*G06F 1/26* (2006.01)
(Continued)

(52) U.S. Cl.
CPC ............ *G06F 1/266* (2013.01); *G06F 1/1632* (2013.01); *G06F 21/44* (2013.01)

(58) Field of Classification Search
None
See application file for complete search history.

(56) References Cited

U.S. PATENT DOCUMENTS

| 5,717,902 A | 2/1998 | D'Souza et al. |
| 6,202,095 B1 | 3/2001 | Beardsley et al. |

(Continued)

FOREIGN PATENT DOCUMENTS

| CN | 101971453 A | 2/2011 |
| CN | 102822812 A | 12/2012 |

(Continued)

OTHER PUBLICATIONS

"Non-Final Office Action", U.S. Appl. No. 15/604,367, dated Mar. 2, 2018, 20 pages.

(Continued)

*Primary Examiner* — Nitin C Patel
(74) *Attorney, Agent, or Firm* — Rainier Patents, P.S.

(57) ABSTRACT

Power management contracts for accessory devices are described. In one or more implementations, a power management contract is established for a system including a host computing device and an accessory device based at least in part upon power exchange conditions observed for the system. The power management contracts define operating constraints for power exchange between components of the system, including at least a power exchange direction and current limits. The host computing device and accessory devices are each configured to renegotiate the power management contract to dynamically change operating constraints in "real-time." Additionally, different power management contracts may be associated with identifying data corresponding to different types of accessory devices.

20 Claims, 7 Drawing Sheets

(51) Int. Cl.
*G06F 1/16* (2006.01)
*G06F 21/44* (2013.01)

(56) References Cited

U.S. PATENT DOCUMENTS

| | | | |
|---|---|---|---|
| 7,830,823 | B2 | 11/2010 | Holloway et al. |
| 8,520,512 | B2 | 8/2013 | Gilde et al. |
| 8,880,901 | B2 | 11/2014 | Drepper |
| 2002/0041590 | A1 | 4/2002 | Donovan |
| 2005/0007967 | A1 | 1/2005 | Keskar et al. |
| 2006/0218302 | A1 | 9/2006 | Chia et al. |
| 2008/0034075 | A1 | 2/2008 | Luinstra et al. |
| 2008/0164934 | A1 | 7/2008 | Hankey et al. |
| 2009/0005885 | A1 | 1/2009 | Qahouq et al. |
| 2009/0177759 | A1 | 7/2009 | Ogawa et al. |
| 2010/0191837 | A1 | 7/2010 | Linden et al. |
| 2010/0262744 | A1 | 10/2010 | Deva et al. |
| 2011/0302347 | A1 | 12/2011 | Schubert et al. |
| 2013/0070753 | A1 | 3/2013 | Sahni et al. |
| 2013/0232571 | A1 | 9/2013 | Belesiu et al. |
| 2013/0290570 | A1 | 10/2013 | Uddenberg et al. |
| 2013/0326404 | A1 | 12/2013 | Brooks et al. |
| 2014/0098682 | A1 | 4/2014 | Cao et al. |
| 2015/0304165 | A1 | 10/2015 | Menezes et al. |
| 2015/0379353 | A1 | 12/2015 | Mate et al. |
| 2017/0141962 | A1 | 5/2017 | Britt et al. |

FOREIGN PATENT DOCUMENTS

| | | | |
|---|---|---|---|
| CN | 103365388 | A | 10/2013 |
| CN | 103365817 | A | 10/2013 |
| CN | 103490459 | A | 1/2014 |
| CN | 103677193 | A | 3/2014 |
| EP | 2461310 | A3 | 6/2012 |
| EP | 2662750 | A2 | 11/2013 |
| JP | H11150876 | A | 6/1999 |
| JP | 2000099220 | A | 4/2000 |
| JP | 2001075682 | A | 3/2001 |
| JP | 2007087040 | A | 4/2007 |
| JP | 2013254408 | A | 12/2013 |
| RU | 2195064 | C2 | 12/2002 |
| RU | 2464632 | C2 | 10/2012 |
| RU | 2012128320 | A | 2/2014 |

OTHER PUBLICATIONS

"Foreign Office Action", EP Application No. 15729276.4, dated Mar. 9, 2018, 8 pages.
"International Search Report and Written Opinion Issued in PCT Patent Application No. PCT/US2015/024594", dated Jul. 24, 2015, 9 Pages.
"Final Office Action Issued in U.S. Appl. No. 14/257,502", dated Jul. 21, 2016, 19 Pages.
"Non-Final Office Action Issued in U.S. Appl. No. 14/257,502", dated Feb. 1, 2016, 20 Pages.
"Office Action Issued in Mexican Patent Application No. MX/a/2016/015071", dated Mar. 27, 2018, 2 Pages. (W/o English Translation).
"International Preliminary Report on Patentability Issued in PCT Application No. PCT/US2015/024594", dated Mar. 24, 2016, 7 Pages.
"Corporate Telecommunication Networks—Mobility for Enterprise Communications", In Final Draft, Technical Report of ECMNTC32-TG17/2010/056, 2nd Edition, Oct. 1, 2010, 38 Pages.
"Non Final Office Action Issued in U.S. Appl. No. 15/604,367", dated Jan. 24, 2019, 19 Pages.
"Summons to Attend Oral Proceedings Issued in European Patent Application No. 15729276.4", dated May 29, 2019, 10 Pages.
"First Office Action and Search Report Issued in Chinese Patent Application No. 201580025742.2", dated Dec. 4, 2018, 19 Pages.
"Office Action and Search Report Issued in Russian Patent Application No 2016145229", dated Jan. 11, 2019, 8 Pages. (W/o English Translation).
"Final Office Action Issued in U.S. Appl. No. 15/604,367", dated Aug. 16, 2018, 21 Pages.
"Office Action Issued in Japanese Patent Application No. 2016-567988", dated Sep. 5, 2018, 17 Pages.
"Notice of Allowance Issued in Russian Patent Application No. 2016145229", dated May 23, 2019, 22 Pages.
"Summons to Attend Oral Proceedings Issued in European Patent Application No. 15729276.4", dated Jun. 28, 2019, 2 Pages.
"First Office Action Issued in Chinese Patent Application No. 201580025742.2", dated Apr. 4, 2019, 17 Pages.
"Office Action Issued in Chinese Patent Application No. 201580034297.6", dated Mar. 25, 2019, 17 Pages.
"Office Action Issued in Japanese Patent Application No. 2016-567988", dated Mar. 19, 2019, 14 Pages.
"Office Action Issued in Australian Patent Application No. 2015264456", dated Dec. 10, 2019, 4 Pages.
"Office Action Issued in Australian Patent Application No. 2015274582", dated Dec. 13, 2019, 2 Pages.
"Office Action Issued in Japanese Patent Application No. 2016572667", dated Mar. 5, 2019, 6 Pages.
"Final Office Action Issued in Chinese Patent Application No. 201580025742.2", dated Dec. 16, 2019, 9 Pages.
"First Office Action Issued in Chinese Patent Application No. 201580031657.7", dated Aug. 31, 2018, 17 Pages.
"Second Office Action Issued in Chinese Patent Application No. 201580025742.2", dated Aug. 30, 2019, 15 Pages.
"Second Office Action Issued in Chinese Patent Application No. 201580034297.6", dated Aug. 29, 2019, 5 Pages.
"Notice of Allowance Issued in U.S. Appl. No. 15/604,367", dated Aug. 7, 2019, 10 Pages.

POWER MANAGEMENT CONTRACTS FOR ACCESSORY DEVICES

RELATED APPLICATION

This application is a continuation of, and claims priority to, U.S. patent application Ser. No. 14/281,518, filed May 19, 2014, now U.S. Pat. No. 9,874,914, entitled "Power Management Contracts for Accessory Devices", the disclosure of which is incorporated by reference herein in its entirety.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

One challenge that faces developers of mobile computing devices is efficient power management and battery life. For instance, a host computing device and supported accessories may have limited availability of power from internal power supplies. In some scenarios, a device may obtain supplemental power from other devices and/or an external power source (e.g., an external battery). However, traditional power management schemes may set fixed constraints upon the manner in which devices exchange power. As such, changes that may occur in operating conditions may not be properly accounted for, and this may result in inefficient power utilization.

Power management contracts for accessory devices are described. In one or more implementations, a power management contract is established for a system including a host computing device and an accessory device based at least in part upon power exchange conditions observed for the system. The power management contracts define operating constraints for power exchange between components of the system, including at least a power exchange direction and current limits. The host computing device and accessory devices are each configured to renegotiate the power management contract to dynamically change operating constraints in "real-time." Additionally, different power management contracts may be associated with identifying data corresponding to different types of accessory devices.

Upon connection of an accessory device to the host computing device, data indicative of the identity is obtained and used to verify whether the accessory device is an authorized accessory. Interaction with the accessory device may be restricted if the accessory device is not authorized. When the accessory device is an authorized accessory, however, the data indicative of the identity may be used to look-up power contract settings associated with the accessory device and set a power exchange direction, current limits, and/or other operating constraints accordingly. When either the host or accessory detects a change in power exchange conditions that necessitate an update to the power management contract, power contract update messages are communicated between the host and accessory to effectuate a real-time update to the power exchange operating constraints and thereby activate an updated power contract.

In the following discussion, an example environment and devices are first described that may employ the techniques described herein. Example details and procedures are then described which may be performed in the example environment and by the devices as well as in other environments and by other devices. Consequently, implementation of the example details and procedures is not limited to the example environment/devices and the example environment/devices are not limited to the example details and procedures.

Example Operating Environment

Figure 1:
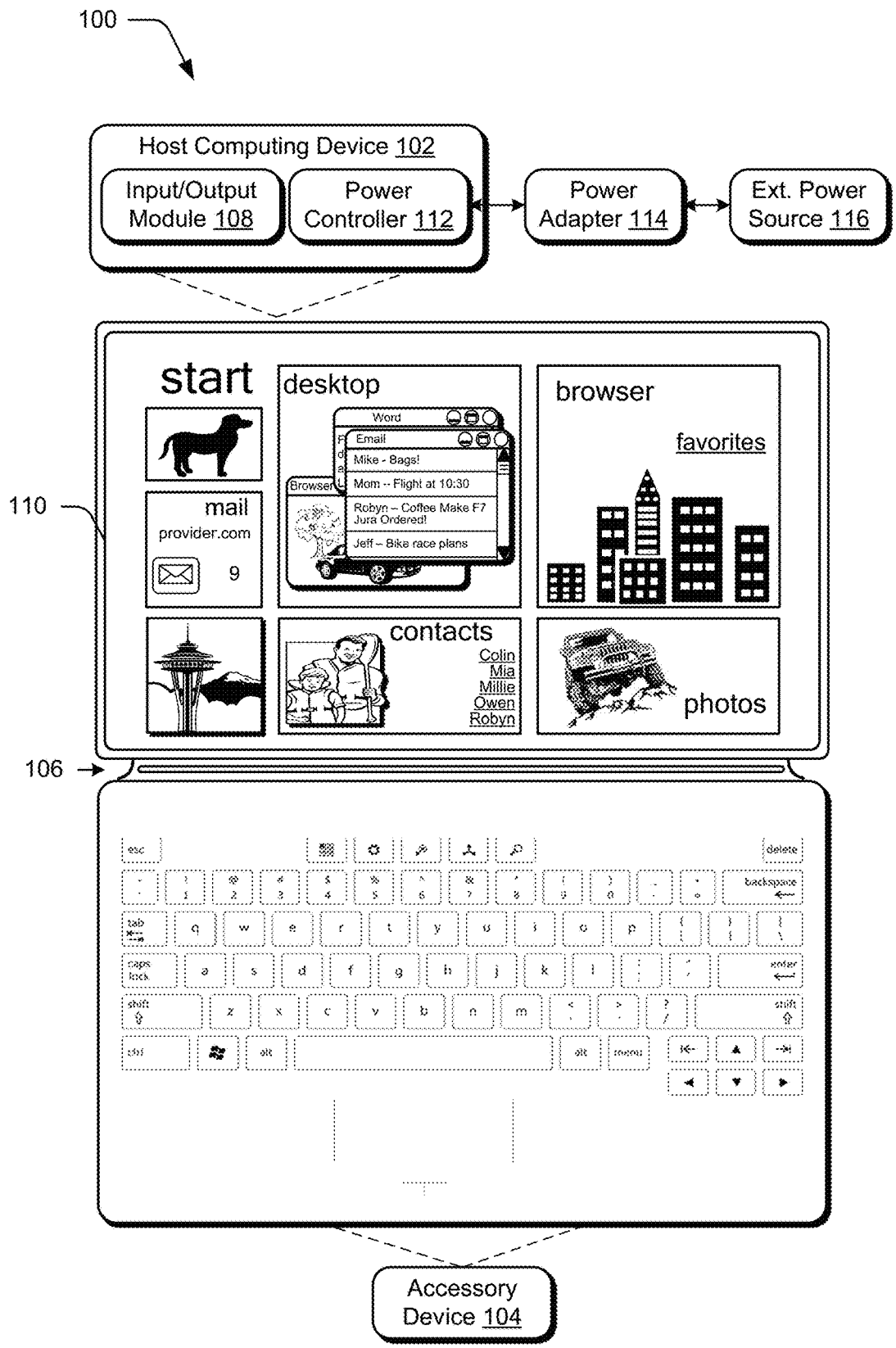
FIG. 1 is an illustration of an environment in an example implementation that is operable to employ the techniques described herein.

FIG. 1 is an illustration of an environment 100 in an example implementation that is operable to employ the techniques described herein. The illustrated environment 100 includes an example of a host computing device 102 that is physically and communicatively coupled to an accessory device 104 via an interface 106. The host computing device 102 may be configured in a variety of ways. For example, the computing device 102 may be configured for mobile use, such as a mobile phone, a wearable device, a tablet computer as illustrated, and so on. Thus, the host computing device 102 may range from full resource devices with substantial memory and processor resources to a low-resource device with limited memory and/or processing resources. The host computing device 102 may also relate to software that causes the host computing device 102 to perform one or more operations.

The host computing device 102, for instance, is illustrated as including an input/output module 108. The input/output module 108 is representative of functionality relating to processing of inputs and rendering outputs of the host computing device 102. A variety of different inputs may be processed by the input/output module 108, such as inputs relating to functions that correspond to keys of the input device, keys of a virtual keyboard displayed by the display device 110 to identify gestures and cause operations to be performed that correspond to the gestures that may be recognized through the accessory device 104 and/or touchscreen functionality of the display device 110, and so forth. Thus, the input/output module 108 may support a variety of different input techniques by recognizing and leveraging a division between types of inputs including key presses, gestures, and so on.

In the illustrated example, the accessory device 104 is a device configured as a keyboard having a QWERTY arrangement of keys although other arrangements of keys are also contemplated. Further, other non-conventional configurations for an accessory device 104 are also contemplated, such as a game controller, configuration to mimic a musical instrument, a power adapter, a docking station, a USB hub, an external battery, combinations of these configurations, and so forth. Thus, the accessory device 104 may assume a variety of different configurations to support a variety of different functionality. Different accessory devices may be removably connected to the computing device at different times.

As previously described, the accessory device 104 is physically and communicatively coupled to the host computing device 102 in this example through an interface 106 in the form of a flexible hinge. The flexible hinge 106 represents but one illustrative example of an interface 106 that is suitable to connect and/or attach an accessory device to a host computing device 102. The flexible hinge, for instance, may be formed using one or more layers of fabric and include conductors formed as flexible traces to communicatively couple the accessory device 104 to the host computing device 102 and vice versa. The flexible hinge is flexible in that rotational movement supported by the hinge is achieved through flexing (e.g., bending) of the material forming the hinge as opposed to mechanical rotation as supported by a pin, although that embodiment is also contemplated. By such rotational movement, the flexible hinge enables the accessory device 104 to assume a variety of positions relative to the host computing device 102 including but not limited a closed position in which the accessory may act as a cover, an open or typing position, and/or a tablet position in which the accessory is rotated to lay flat against a "back" side of the host computing device 102 (e.g., a side that opposes the illustrated "front" side having the display device 110.)

Other types of interfaces 106 and connectors are also contemplated such as uses of magnetic coupling devices, integrated communication ports and communication contacts, mechanical coupling protrusions, slots, and/or indentions, individually or in combination to form different types of interfaces 106. In one example, the interface 106 may be configured as a communication port configured to enable connection to accessory devices via a corresponding connector and/or connector cord. In at least some implementations, the interface 106 is configured to enable communications for authentication and control of the accessory device 104 as described herein. For example, the computing device 102 may receive credentials (e.g., data indicative of an identity of an accessory) and other data regarding capabilities of the accessory device through the interface responsive to detecting the presence/attachment of the accessory device 104. The interface may also provide a power coupling for exchange of power and communication of messages to implement and update power management contracts as described above and below.

As further illustrated in FIG. 1 the computing device 102 may include a power controller 112 configured to implement aspects of power management contract techniques described herein. In particular, the power controller 112 represents functionality to perform various operations for power management including handling settings for power management operating constraints defined by power management contracts, selectively activating contracts based on accessory identities, facilitating exchange of power management messages between the host and accessories, and updating power management contracts dynamically in response to changes in observed conditions. Power management implemented by the power controller 112 may also include management of different power sources and switching between the sources, implementing a defined and/or selected power management scheme, managing battery life, and so forth. The power controller 112 may further facilitate connections and communications with a power adapter 114 (also referred to herein as a power supply unit (PSU)) configured to supply power to the device via a suitable external power source 116, such as a wall socket, external battery, power supply unit, or other of power source. The power controller 112 may also be operable to supply power to accessory devices in appropriate circumstances. In other words, the power controller 112 may manage power operations jointly for a host computing device and authorized accessory devices including power exchange between the host computing device and an accessory device.

The power controller 112 may be implemented in hardware, software, firmware and/or combinations thereof. By way of example and not limitation, the computing device 102 may include a microcontroller or other suitable hardware logic device configured to implement various functionally that is described herein in relation to power controller 112. The power controller 112 may therefore represent firmware or logic associated with a suitable hardware logic device. In addition or alternatively, the power controller 112 may be implemented by way of a processing system of the device and one or more program modules that are executable/operable via the processing system.

The power adapter 114 may be configured to selectively operate in multiple modes and supply multiple power levels to the computing device. The level of power supplied at a particular time may be based upon input, notifications, or other suitable feedback configured and sent to the power adapter 114 by the power controller 112 to cause the power adapter 114 to supply a corresponding level of power. Depending upon a power exchange state, the power adapter 114, when connected to the computing device, may charge a battery associated with one or both of the host and accessory, supply power to support operations of one or both the host and accessory, and otherwise supply power from external power sources 116 for joint charging and operation of the host and accessory in various combinations. Power management contracts implemented via the power controller 112 may be configured to control flow of power between system components (e.g., host, accessory, and adapter) in dependence upon accessory identity, power exchange conditions, power source availability, and so forth. Further details regarding operation of the power controller 112 and the power adapter 114 to implement power management contracts for accessory devices can be found in the following discussion.

Example Power Management Contract Details

Figure 2:
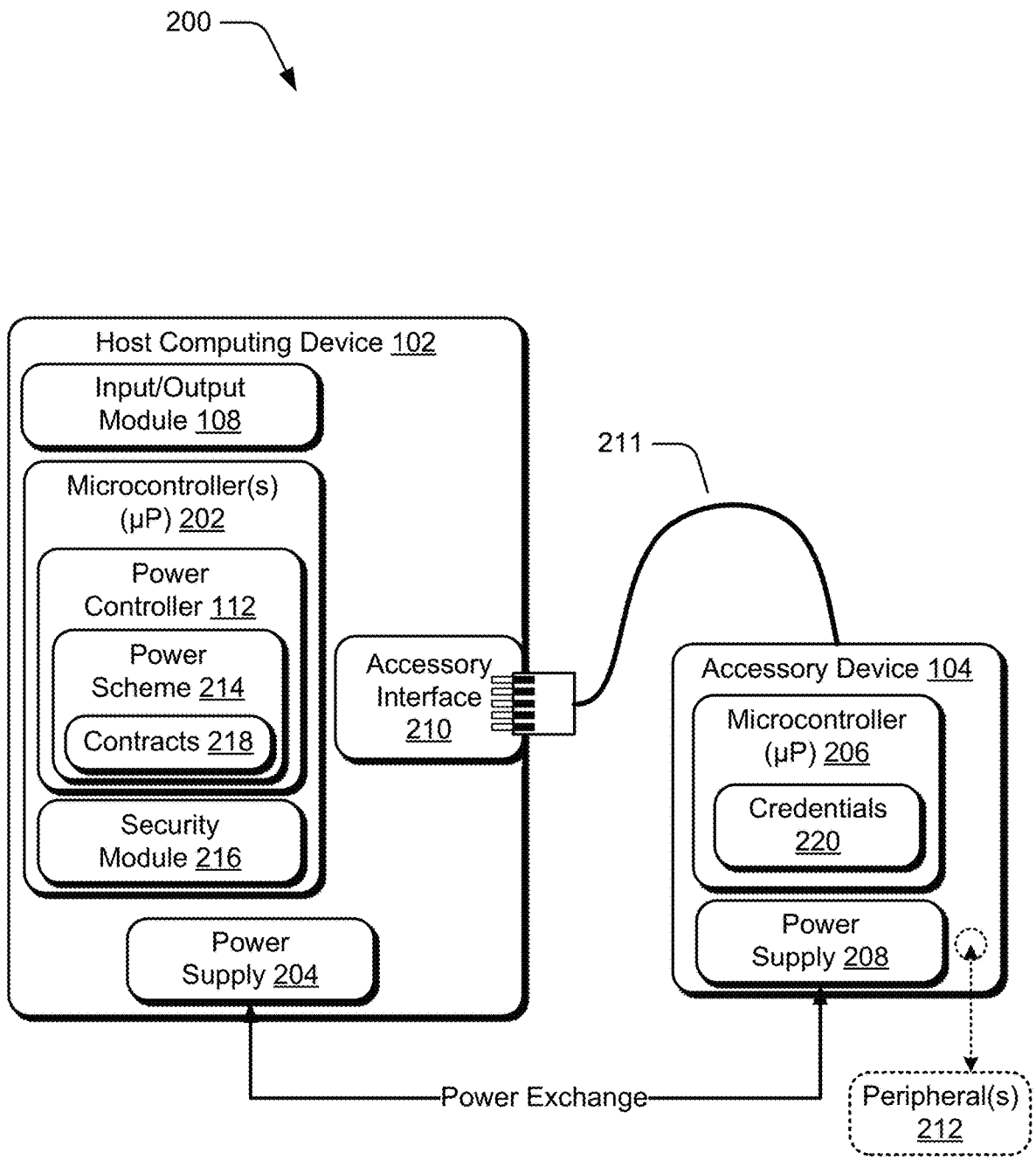
FIG. 2 depicts an example computing device and accessory device of FIG. 1 in greater detail.

FIG. 2 depicts generally at 200 an example host computing device 102 and accessory device 104 in greater detail. In FIG. 2, the host computing device 102 is depicted as having a power controller 112 is illustrated as being provided by one or more microcontroller(s) 202, also referred to as microprocessing unit(s) (µP). The computing device 102 further includes an associated power supply 204, such as one or more internal batteries. The accessory device 104 may also include one or more microcontroller(s) 206 and a respective power supply 208. The power supply 208 may be configured as one or more batteries that are internal to the accessory device 104 (e.g., an accessory battery) and may therefore be considered external batteries with respect to the host computing device 102.

The example microcontrollers (µPs) represent hardware devices/systems that are designed to perform a predefined set of designated tasks. Microcontrollers may represent respective on-chip systems/circuits having self-contained resources such as processing components, I/O devices/peripherals, various types of memory (ROM, RAM, Flash, EEPROM), programmable logic, and so forth. Different microcontrollers may be configured to implement embedded applications/functionality that are implemented at least partially in hardware and perform corresponding tasks. In particular, the example microcontrollers 202, 206 enable performance of tasks for device authentication and power management outside of operation of a general purpose processing system and other applications/components of the computing device or accessory device. Generally, power consumption of the microcontrollers is low in comparison with operating a general purpose processing system for a device.

Accordingly, components implemented via microcontrollers may operate using relatively low power, independently of operating a "primary" processing system of a host computing device, and/or without booting/executing an operating system or using other device components and applications. In other words, the microcontrollers may operate to perform some power management tasks in a low power mode without having to operate or supply power to the processing system and other device components (e.g., device memory, network interface, display device, etc.) and/or without completely starting-up or waking-up the computing device.

The host computing device 202 may be connectable to different accessory devices via an accessory interface 210. The accessory interface 210 is representative of functionality to achieve a physical and communicative coupling between the host computing device and various accessories. For example, a connector 211 corresponding to the accessory interface 210 may be employed to connect accessories to the host computing and enable exchange of control signals, data, and power. In the depicted example, the connector 211 is illustrated as a connector cord that may be removably inserted into a corresponding port associated with the accessory interface 210, although other types of connections are also contemplated, such as the flexible hinge discussed in relation to FIG. 1, connections to a docking station discussed in relation to the following figure, and/or another suitable interfaces and connector combinations. Alternatively, wireless communications may be employed between accessory and host devices. In that alternative example, host and accessory devices may communicate contracts for wireless power exchange, for example, power exchanged via inductive power coupling.

As represented in FIG. 2, power exchange may occur between the power supply 204 of the host and the power supply 208 of the accessory in accordance with techniques described above and below. In some implementations, power exchange may also occur with an external power source 116 configured as an external battery via a power adapter 114 as represented in FIG. 1. In other words, three-way power exchange may occur between batteries/power supplies corresponding to the host, an accessory connected via the accessory interface, and an external power source. Generally, power exchange between the host and one or more connected devices (adapters/accessories/peripherals) may occur back and forth (e.g., bi-directionally) from the host to one or more of the devices, from one or more of the devices to the host, and/or directly between connected devices (e.g., device to device) through the host.

Thus, power exchange may occur via the accessory interface 210 in some scenarios. Power supplied to the host computing device may be used to operate the host (e.g., service the system load) and/or to maintain a charge level of the power supply 204 (e.g., internal battery). Additionally, power supplied to the host may be supplied directly or indirectly to the accessory device 104 to support operations and/or charge the power supply 208 (e.g., external battery). Moreover, power may be distributed from the host computing device 102 and/or the accessory device 104 to one or more peripherals 212 that may be connected directly to the host computing device and/or connected to the system through the accessory device 104 as represented in FIG. 2. For example, in one or more implementations an accessory device may be configured to provide functionality of a peripheral device hub, such as a hub that provides multiple universal serial bus (USB) ports and/or other types of connection ports to which a variety of peripherals 212 may be connected. The peripherals 212 may include various devices, such as a peripheral display device, a printer, a scanner, audio devices, a camera, a storage device, or a network adapter, to name a few examples.

It should be noted that the host computing device 102 and accessory device 104 may both be configured to employ external power sources 116, such as through the use of respective power adapters 114 connected to a wall socket or another source. Power supplied directly to the accessory device 104 via a respective power adapter 114 may be used, shared, and/or exchanged between the host and accessory in a manner comparable to power that is supplied directly to the host computing device 102.

The host computing device may be further configured to implement a power scheme 214 and a security module 216 in various ways. In the illustrated example, the power scheme 214 is depicted as being implemented via the power controller 112. In this example, the power scheme 214 is configured as firmware associated with the host computing device 102. For example, the power scheme 214 may represent firmware associated with a microcontroller 202, power controller 112, or other suitable hardware logic device. Alternatively, the power scheme 214 may be implemented as a standalone module using any suitable combination of hardware, software, firmware, and/or logic devices.

The power scheme 214 represents functionality to implement power management contract techniques described above and below as well as other power management functions. In particular, the power scheme 214 may be configured to jointly manage power flow between a power adapter 114, host computing device 102, and accessory device 104. By way of example and not limitation, this may include controlling power flow to selectively charge batteries associated with the components; exchange power between the batteries, processing systems, and components; supply power to service the system load for the host and accessory; and so forth. In order to do so, the power scheme 214 may provide functionality to establish, enforce, and update power management contracts 218 between various components of the system. This functionality may include support for sending and receiving messages regarding power management contracts between system components. As noted, the power management contracts 218 are configured to define operating constraints for power management including but not limited to specifying power exchange direction and current limits for different devices and scenarios. Moreover, the settings for power management contracts 218 may be modified in real-time based on conditions observed by the host or accessory. Thus, initial or default settings for a power management contracts 218 may be associated with different accessories and appropriate contracts may be activated upon initial connection and authorization of the different accessories. The initially activated power management contracts 218 may be modified thereafter based upon conditions including but not limited to relative states of charge (RSOC) for batteries of the system components, power loads being serviced, a number of peripherals 212 connected to the host and/or accessory, power source availability for system components, power supply characteristics, processing loads, and so forth. Thus, rather than fixing operating constraints for power exchange at the time accessories and/or peripherals are connected to the system, the power management contracts 218 and associated techniques discussed herein are designed to enable dynamic adjustments to such constraints in response to changing conditions at any time during connection of an accessory to a host. Such modifications of initial settings for a power management contract 218 based on "real-time" conditions may be initiated by accessory devices and/or by the host computing device.

The security module 216 represents functionality operable to identify and/or authenticate accessory devices when the devices are attached/connected to the computing devices. The security module 216 may be configured to implement a variety of different authentication techniques. Generally speaking, the security module 216 performs an authentication sequence in which credentials 220 (e.g., device ID/password, alphanumeric code, an identifying resistor value, etc.) associated with an accessory device 104 are obtained and verified. The accessory device 104 in FIG. 2 is illustrated as including example credentials 220, which may be provided to the security module 216 for authentication upon request.

If the credentials are valid (e.g., the device is a recognized device that has associated privileges), the authentication is considered successful and the accessory device 104 may be authorized for power exchange through the power controller 112 and other interaction with the host computing device 102. Moreover, the credentials 220 may be associated with power management contract settings maintained for authorized device and therefore may be used to look-up and activate such settings (e.g., initial or default settings) for different devices upon successful authentication. On the other hand, if the credentials are not valid, interaction of the accessory device 104 with the computing device 102 may be restricted in various ways and/or prevented. Thus, the security module 216 may prevent unauthorized devices from supplying/using power in ways that may be inefficient and/or unsafe.

Figure 3A:
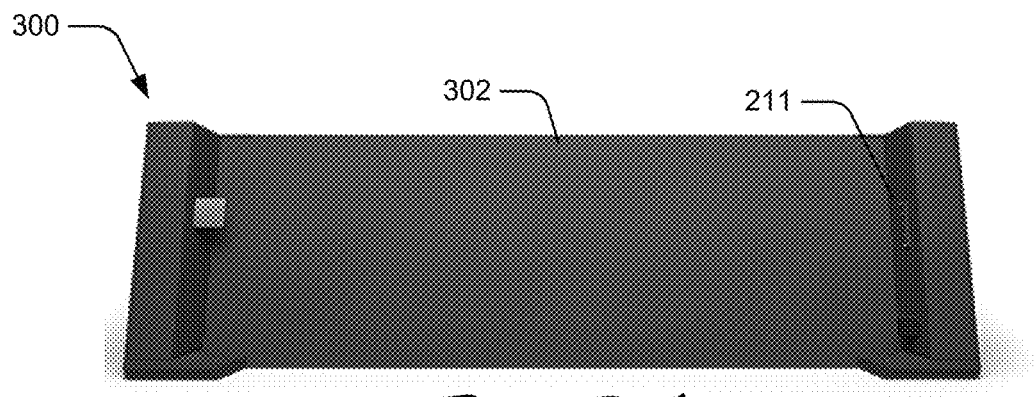
FIG. 3A depicts an example view of an accessory device configured as a docking station in accordance with one or more implementations.
Figure 3B:
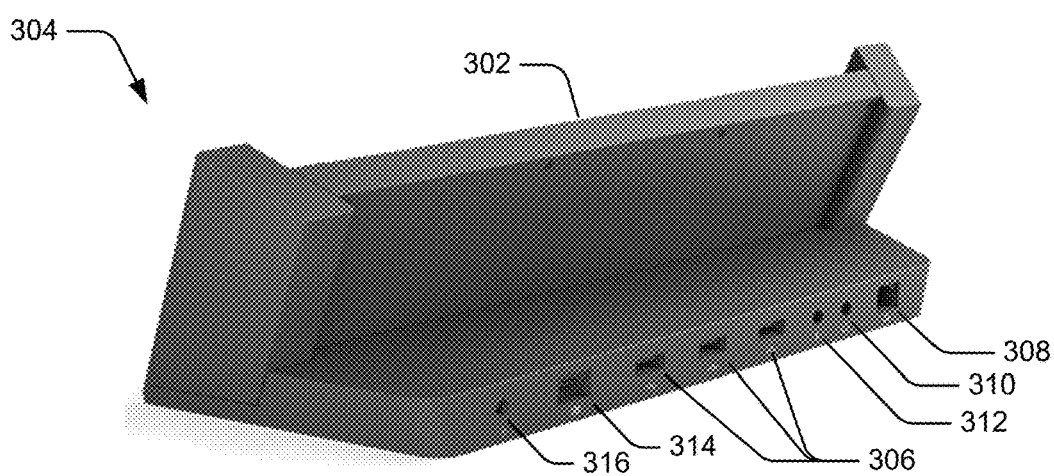
FIG. 3B depicts an example perspective view of the docking station of FIG. 3A to illustrate representative ports on a back side of the device in accordance with one or more implementations.
Figure 3C:
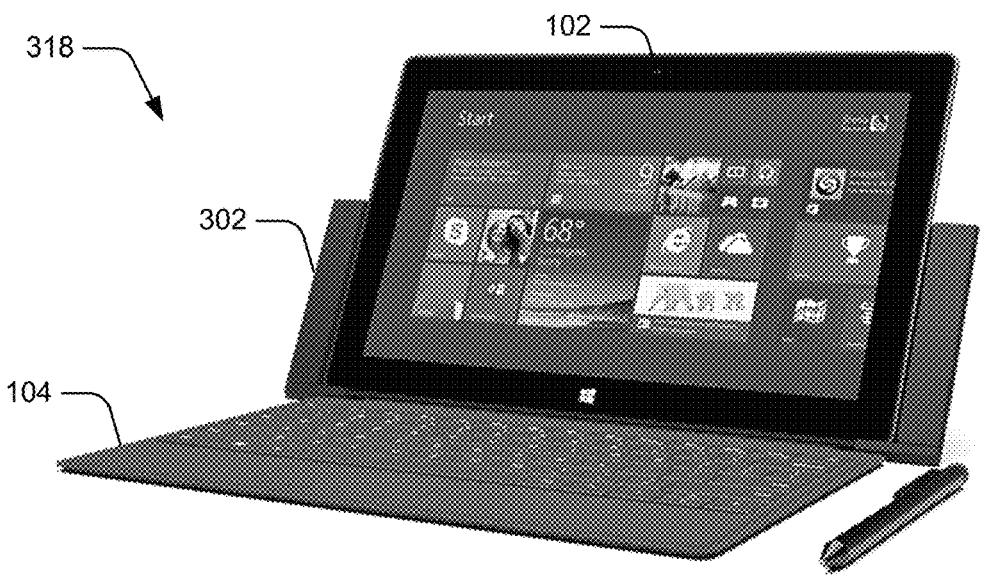
FIG. 3C depicts an example view of a system that includes the docking station of FIGS. 3A and 3B and a host computing device shown as being inserted in and connected to the docking station.

As mentioned, the power management contract techniques discussed herein may be employed with accessory devices configured to provide functionality of a peripheral device hub, such as a standalone hub, a docking station, a monitor that incorporates a peripheral device hub, and so forth. Such accessory devices may include ports and connectors for various kinds of device including but not limited to USB, parallel interface connections, serial interface connections, firewire, PS/2, HDMI, and other types of ports and connection mechanisms. By way of example and not limitation, FIGS. 3A to 3C illustrate one particular example of an accessory device in the form of a docking station that integrates a peripheral device hub. In particular, FIG. 3A depicts an example view 300 of an accessory device configured as a docking station 302 in accordance with one or more implementations. In this example, the docking station 302 is configured to receive and connect to a host computing device 102 having a slate form factor (e.g., a tablet). The docking station 302 may include one or more connectors 211 designed to create a communicative and physical coupling to an accessory interface 210 of a host computing device 102. Here, the slate form device may be slidably and removably received into the docking station 302. When inserted into the docking station 302, a power controller 112 of the slate device may implement a power scheme 214 and power management contracts 218 to jointly manage power (e.g., for a host, accessory, adapter, and/or peripherals of an interconnected system) in the manner discussed herein.

FIG. 3B depicts an example perspective view 304 of the docking station 302 of FIG. 3A to illustrate representative ports on a back side of the device in accordance with one or more implementations. By way of example and not limitation, the example docking station 302 includes a plurality of USB ports 308 that may operate as a USB hub, a Ethernet port 308, an audio out port 310 (e.g., for speakers or headphones), an audio in port 312 (e.g., for a microphone or auxiliary audio), a power adapter port 314, and a display port 316 for connection of a peripheral display device. The USB ports 308 as well as other ports may be configured to provide power to connected peripheral devices. As such, the ability of the docking station 302 to exchange power with the host may vary based upon the number of peripheral devices connected to the dock and the power load at any given time. The power management contracts 218 described herein may therefore be utilized to vary operating constraints accordingly as the number of peripherals, peripheral load, and/or other power management conditions discussed herein change.

FIG. 3C depicts an example view 318 of a system that includes the docking station 302 of FIGS. 3A and 3B and a host computing device 102 shown as being inserted in and connected to the docking station. In this example, the host computing device 102 is illustrated as being a slate form factor device (e.g., a tablet). The host computing device 102 is also shown as being connected to another accessory device 104 in the form of a keyboard that may be manipulable into various positions via an interface 106 (e.g., a flexible hinge) as discussed previously. In this arrangement, a power controller 112 may implement a power scheme 214 and power management contracts 218 to jointly manage power for interconnected components of the system in the manner discussed herein, including the keyboard connected to the host and any additional peripherals 212 that are connected to ports of the docking station.

Having considered the preceding discussion of an example operating environment, system, and devices, consider now a discussion of example procedures which includes further details regarding techniques to implement power management contracts for accessory devices.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the example operating environment 100 of FIG. 1 and the example devices of FIGS. 2-3C, respectively. Aspects of the procedures may be performed by a suitably configured computing device, such as the example host computing device 102 of FIG. 2 that includes or otherwise makes use of one or more microcontrollers 202 to implement power management contracts 218. In addition or alternatively, aspects of the procedures may be performed via an accessory device, such as the example accessory device 104 of FIG. 2 that includes or otherwise makes use of one or more microcontrollers 206.

Figure 4:
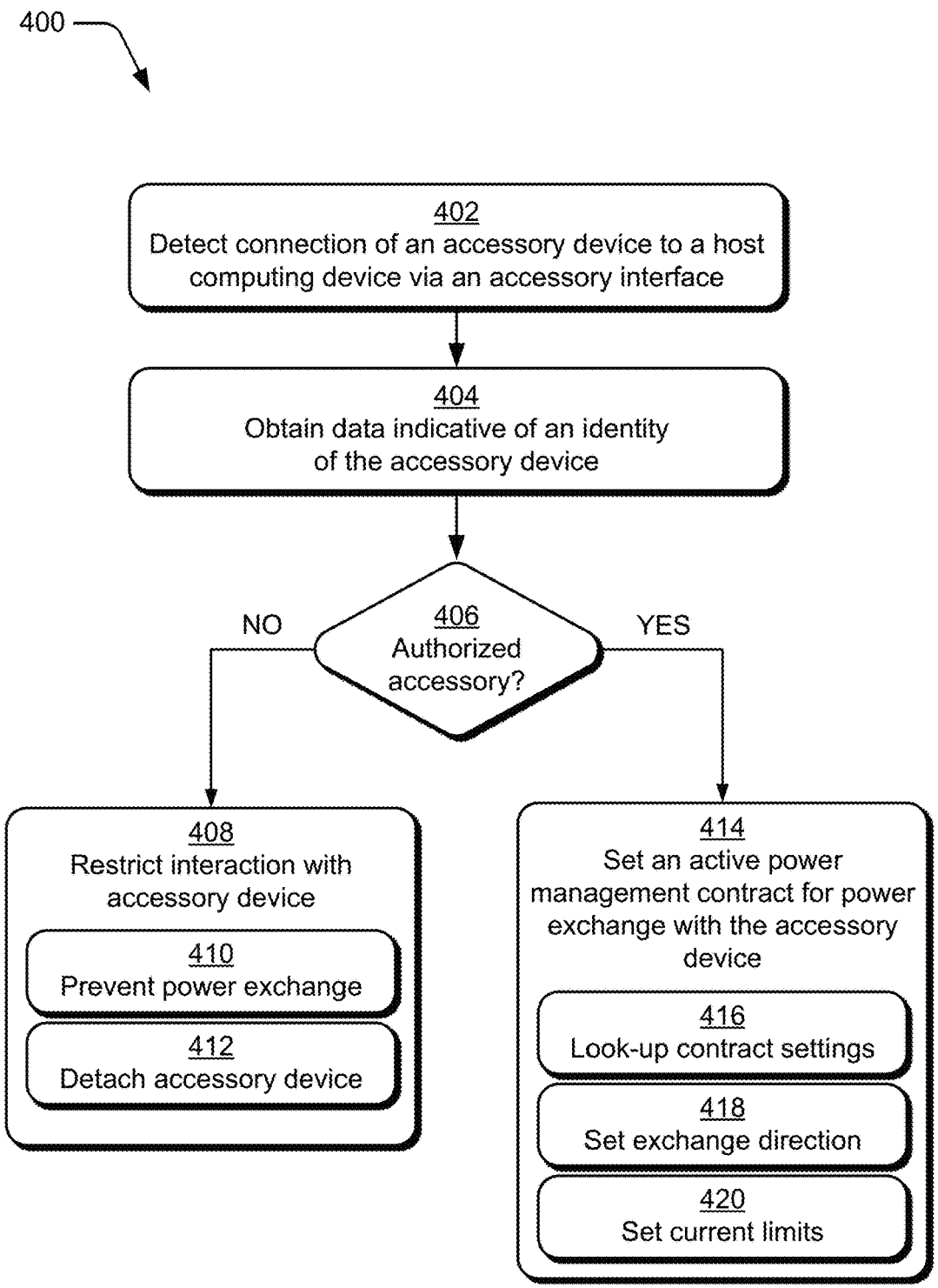
FIG. 4 depicts an example procedure in accordance with one or more implementations.

FIG. 4 depicts an example procedure 400 in which power exchange with an accessory device is controlled in accordance with a power management contract that is associated with the accessory. Connection is detected of an accessory device to a host computing device via an accessory interface (block 402). For example, one or more microcontrollers 202 associated with a host computing device 102 may be configured to recognize connection of various devices to an accessory interface 210. The detection may occur in various ways. In one approach, the one or more microcontrollers 202 are able to detect signals sent by an accessory device when a connector 211 is successfully attached to the accessory interface 210. Alternatively the host computing device 102 may be configured to poll the accessory interface 210 to determine when devices are attached or detached thereto.

After attachment of the accessory device, data indicative of an identity of the accessory device is obtained (block 404). For instance, accessory devices may be configured to supply credentials 220 to the host in various ways as mentioned previously. In one approach, accessory devices are configured to expose a respective resistor value indicative of the identity for reading by the host computing device. Different resistor values may be associated with different types of accessory. Thus, when an accessory is connected, the host computing device may read a corresponding resistor value and distinguish between different accessories on this basis. Alternatively, other credentials 220 may be communicated to the host by an accessory to indicate its identity, such as sending a particular numeric code, an ID field value, a device name, and so forth.

Based on the data indicative of the identity of the accessory device, a determination is made regarding whether the accessory device is an authorized device (block 406). For example, a resistor value or other obtained credential may be employed as a reference to look-up the particular values supplied in a table, list, or other data structure that reflects known values for authorized and/or un-authorized devices. In at least some implementations, the look-up may be performed by a security module 216 as described previously. Based on this look-up, the security module 216 is able to distinguish between authorized and un-authorized devices. The security module 216 may pass results of the authorization determination to a power controller 112 and/or other components to facilitate appropriate actions for power management.

In the event that the accessory device is not authorized, interaction with the accessory device may be restricted (block 408). Various restrictions may be placed on un-authorized devices by the power controller 112. For example, power exchange with the accessory device may be prevented (block 410). In addition or alternatively, the accessory device may be detached (block 412). These and other restrictions may be enforced by the power controller 112 to avoid power exchange and other interaction with "unknown" accessories that may be unsafe and/or lead to unexpected consequences.

On the other hand, in the event that the accessory device is authorized, an active power management contract may be set for power exchange with the accessory device (block 414). In order to do so, a look-up of settings for the power management contract is performed (block 416). Based on this look-up, the exchange direction is set (block 418) and one or more current limits are set (block 420). The settings for the active power management contract define operating constraints for power exchange between components of the systems. In particular, the power controller 112 may maintain a table, file, or other suitable data structure designed to associate authorized devices with corresponding power management contracts and settings for operating constraints. This data structure may reflect initial or default settings that may be activated upon connection of an authorized device. As noted the power management contracts may specify at least power exchange direction and one or more current limits. By way of example and not limitation, the power exchange direction may be indicated by a Boolean value (e.g., zero for "forward" power supply from a host to an accessory and one for "reverse" power supply from the accessory to the host.). The current limits may include either or both of a maximum current level or a minimum current level. Generally, the current limits may be represented by numerical values. A max current limit of zero may be set for an accessory device for example when the accessory is unable to supply power to the host. In this case, the power exchange direction may also be changed accordingly to zero. Alternatively, current limits for an accessory may be set to values that establish constraints on the amount of current the accessory is able to supply for operation and charging of the host under typical operating conditions. Likewise, current limits for exchange from the host to the accessory may be set to values that establish constraints on the amount of current the host is able to supply under typical operating conditions.

As noted, initial or default settings for power management contracts 218 applied at the time an accessory is connected may subsequently be dynamically altered in response to changing conditions. Thus, after setting up the active power management contract, monitoring may be performed to detect changes in conditions that necessitate updating of the settings. Details regarding techniques that may be employed to monitor conditions and dynamically alter settings for an active power management contract are discussed in relation to the following example procedure.

Figure 5:
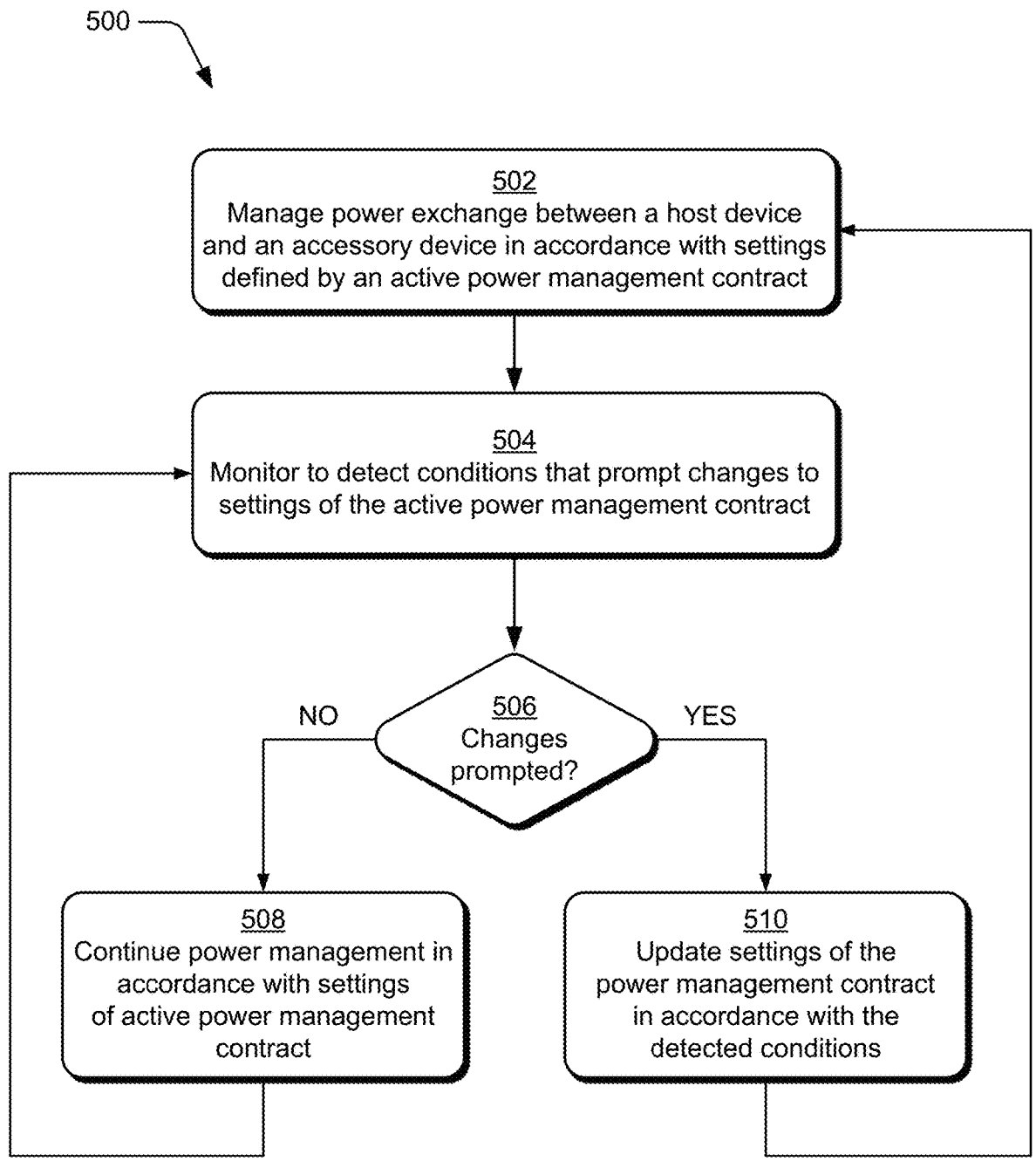
FIG. 5 depicts another example procedure in accordance with one or more implementations.

In particular, FIG. 5 depicts an example procedure 500 in which settings for an active power management contract are modified responsive to changes in power management conditions. Power exchange is managed between a host device and an accessory device in accordance with settings defined by an active power management contract (block 502). For example, a power management contract may be established and activated based on an identity of the accessory in the manner discussed in relation to the example procedure 400 of FIG. 4. The active power management contract may therefore represent initial settings associated with an accessory device. In addition or alternatively, the active power management contract may represent settings that have been modified in real-time based on an update to a previous state that was initiated based on observed conditions.

The active power management contract may be implemented by way of a power controller 112 as previously mentioned. The power controller may send notifications, directives, signal patterns, and/or other power contract update messages to a controller associated with an accessory device 104 (e.g., microcontroller 206) to communicate settings for the power management contract, request changes, approve changes, and otherwise direct the accessory device 104 to enforce a power scheme 214 and/or power management contract 218. For example, directives may be communicated by way of various power contract update messages to change power exchange direction, alter current limits (e.g., supply more or less power), and so forth. The accessory device 104 (e.g., by way of the microcontroller 206 or otherwise) may also be configured to generate and communicate comparable power contract update messages to negotiate power management contracts 218 with the host (e.g., the power controller). Power contract update messages may be configured in a variety of ways. For example, the messages may be configured as pulsed signal patterns that are recognizable by respective controllers of the host and accessory. Various suitable messaging protocols and corresponding message formats are also contemplated, such as using inter-integrated circuit (I²C) protocol, serial peripheral interface (SPI), universal asynchronous receiver/transmitter (UART) messaging, packet based communications, and object based messages, to name a few examples. Further, wireless messaging protocols such as near-field communication, Bluetooth, WiFi, RF protocols used in RFID, or cellular telecommunication protocols may be used.

To enable dynamic, "real-time" modification of power management constraints, monitoring is performed to detect conditions that prompt changes to settings of the active power management contract (block 504). For example, the power controller 112 may be configured to monitor various power management related conditions including but not limited to relative states of charge (RSOC) for batteries of the system components, power loads being serviced, a number of peripherals 212 connected to the host and/or accessory, power source availability for system components, power supply characteristics, processing loads, and so forth. The power controller 112 may be operable to monitor conditions of the host computing device 102 as well as conditions of connected accessory devices 106 and/or peripherals. In an implementation, system components may be configured to report conditions to the power controller 112 using power contract update messages as just described or other notification techniques.

Based on the monitoring, a determination is made regarding whether observed conditions prompt changes to the active power management contract (block 506). Changes may be prompted for example when peripherals are added or removed, additional power sources become available, load requirements change, and so forth. These and other changes in conditions may prompt corresponding changes in operating constraints. For example, if an external battery is connected to an accessory, this action may prompt a change in power exchange direction. In another example, addition of peripherals to the accessory may cause an increase in the load serviced by the accessory and therefore may cause a decrease in a limit placed on current that the accessory is able to deliver to the host. A variety of other examples are also contemplated.

Assuming that changes are not prompted per block 506, power management continues in accordance with the settings of the active power management contract (block 508) and further monitoring per block 504 may be performed. On the other hand, when changes are prompted per the determination of block 506, the settings of the power management contract are updated in accordance with the detected conditions (block 510). For example, the power controller 112 may be configured to modify data defining settings for a power management contract 218 in accordance with observed conditions, such as within a table or other data structure that associates power management contracts with accessory identities. Generally, the settings are temporarily overwritten such that initial or default settings may again be employed the next time an accessory of a given type is connected. However, in some scenarios the default settings may be overwritten in a persistent manner to effectively create new default settings. For example, new default settings may be created to account for a particular system configuration that is unlikely to be frequently changed, such as an arrangement of peripherals with a docking station. In one approach, a prompt may be output to request whether a user would like to retain or discard changes to the power management contract and the changes are then handled in accordance with a response to the request.

Following an update to settings for a contract, the procedure may return to block 502 where the updated power management contract is activated and power management is conducted in accordance with the updated settings. Monitoring per block 504 is again performed to detect any further changes. The example procedure 500 may be repeated again and again in the described manner until the system is shutdown, the host is disconnected from accessories, or other intervening events occur that cause the procedure to halt.

Figure 6:
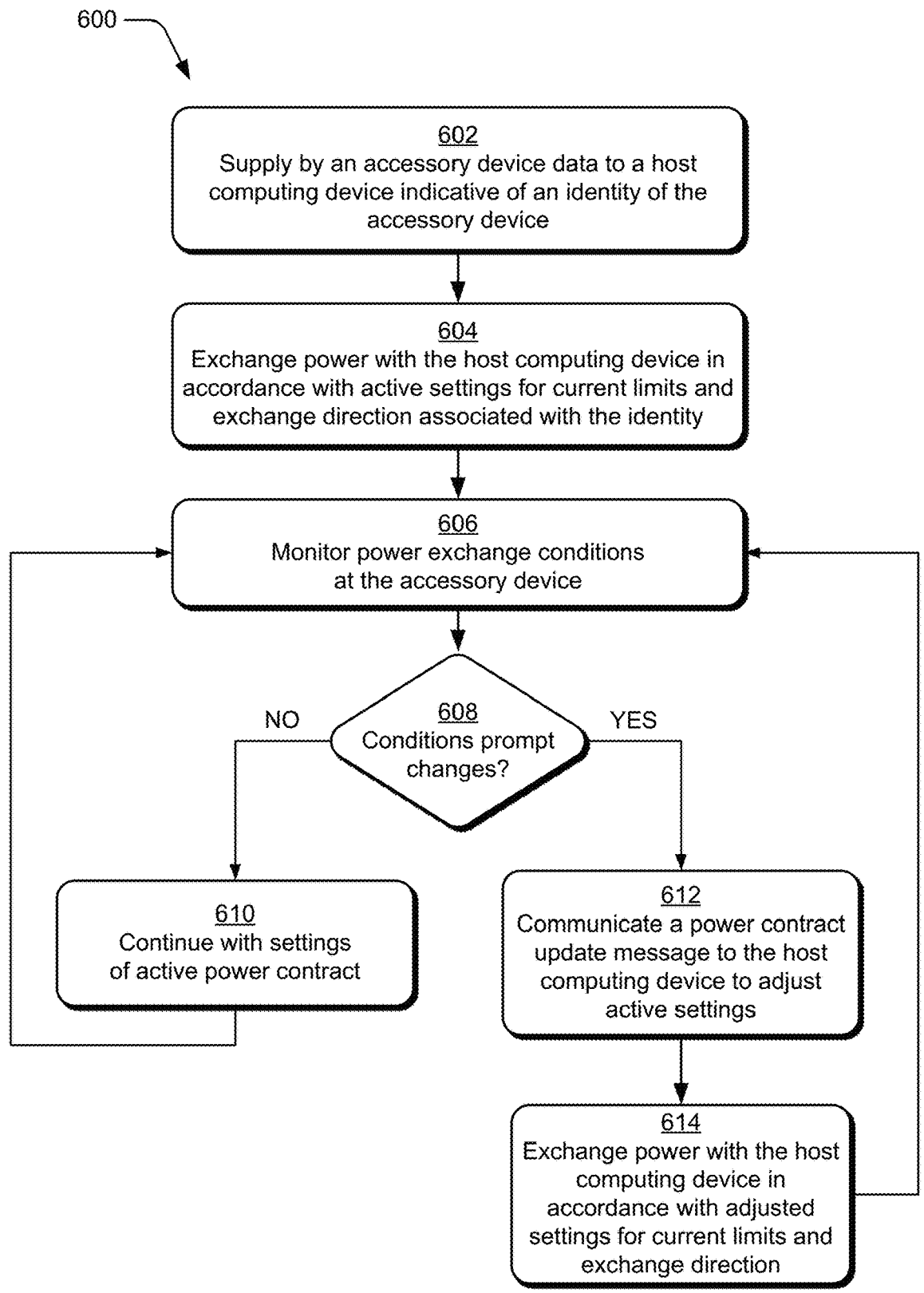
FIG. 6 depicts another example procedure in accordance with one or more implementations.

FIG. 6 depicts an example procedure 600 in which an accessory device initiates a contract change based on conditions observed at the accessory device. An accessory device supplies data to a host computing device indicative of an identity of the accessory device (block 602). For example, the accessory device may supply credentials to a host, expose a resistor value, or otherwise provide data that can be employed to resolve the identity of the accessory device (e.g., the type of device). The identifying data is suitable to enable a host to authorize the accessory device for power exchange or restrict the accessory as described previously. If the host does not recognize the identification information, and cannot resolve the identity of the accessory device, the host may prompt the user to provide information to the host so that the identity of the accessory device may be resolved. Alternatively, the host may automatically search a remote database, or send a query to a remote server, or a cloud-based service, to provide information that may be used to resolve the identity of the accessory device.

Assuming the accessory is authorized, power is exchanged with the host computing device in accordance with active settings for current limits and exchange direction associated with the identity (block 604). In other words, the accessory device may obtain power from the host or supply power to the host as indicated by the power exchange direction setting. Additionally, the power exchange occurs in accordance with the current limits set for exchange between the host and the particular accessory. Then, power exchange conditions are monitored at the accessory device (block 606). By so doing, the accessory device is able to initiate changes to the power contract on its own and/or negotiate changes to the power contract with the host. Generally, the accessory device monitors its own conditions and/or conditions for peripherals that are connected to the accessory. However, the accessory device may also be configured to perform monitoring of the host in some scenarios. Again various conditions may be monitored including but not limited to relative states of charge (RSOC) for batteries of the system components, power loads being serviced, a number of peripherals 212 connected to the host and/or accessory, power source availability for system components, power supply characteristics, processing loads, and so forth.

Based on the monitoring, a determination is made regarding whether observed conditions prompt changes to the power management contract (block 608). Assuming that changes are not prompted per block 608, power management continues in accordance with the settings of the active power management contract (block 610) and further monitoring per block 606 may be performed.

On the other hand, when changes are prompted per the determination of block 608, the accessory device may communicate a power contract update message to the host computing device to adjust the active settings (block 612). For example, a power contract update message may be sent from a microcontroller 206 of the accessory to the power controller 112 of the host to initiate a change in settings. The power contract update messages may be configured in the manner previously described in relation to FIG. 5. The power contract update messages may include at least an indication of the power exchange direction and current limits requested by the accessory device based on observed conditions. In response to the message, the power controller 112 may be configured to automatically apply the requested changes. Alternatively, the power controller 112 may be configured to selectively accept the request, deny the request, or provide alternative settings back to the accessory. Assuming the requested changes are accepted and/or applied, power is exchanged with the host computing device in accordance with adjusted settings for current limits and exchange direction (block 614). Thereafter, further monitoring per block 606 may occur to detect conditions that prompt additional changes. This cycle may be repeated as long as the accessory device remains connected to the host and the system is powered up. When the system is shutdown or the accessory is disconnected, the procedure may be discontinued.

Having considered the foregoing example procedures, consider now a discussion of example systems and devices that may be employed to implement aspects of power management contract techniques in one or more embodiments.

Example System and Device

Figure 7:
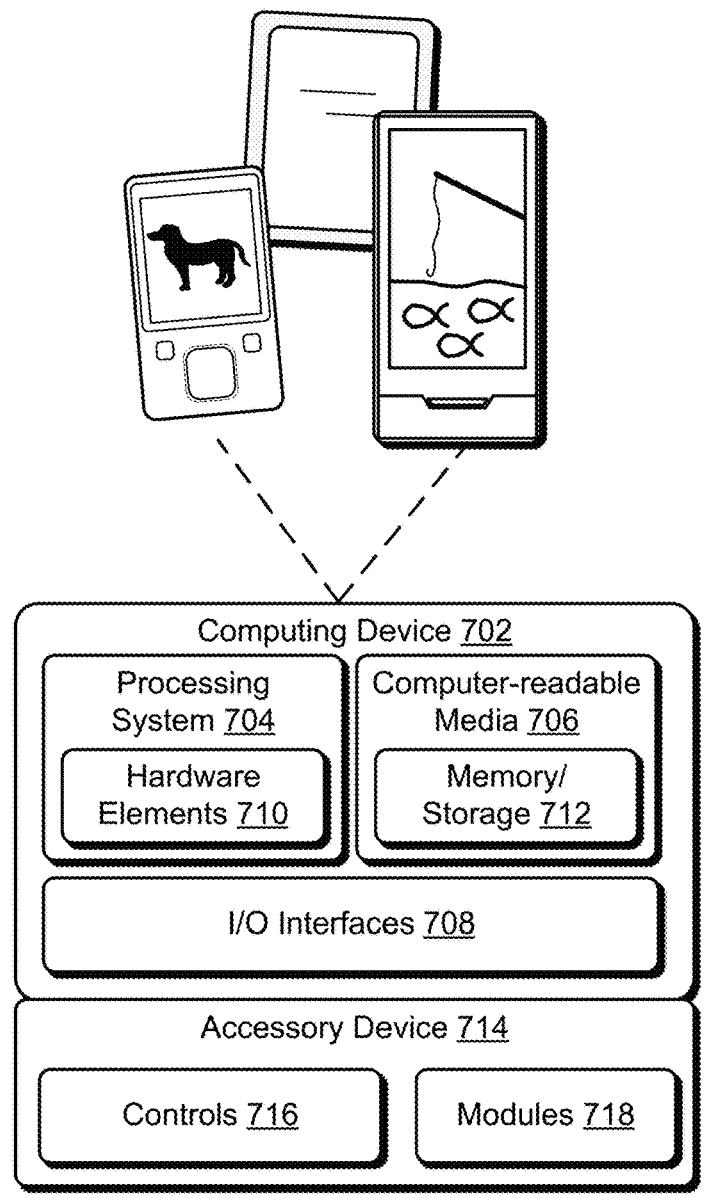
FIG. 7 illustrates an example system including various components of an example device that can be implemented as any type of computing device to implement embodiments of the techniques described herein.

FIG. 7 illustrates an example system generally at 700 that includes an example computing device 702 that is representative of one or more computing systems and/or devices that may implement the various techniques described herein. The computing device 702 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways to support user interaction.

The computing device 702 is further illustrated as being communicatively and physically coupled to an accessory device 714 that is physically and communicatively removable from the computing device 702. In this way, a variety of different input devices may be coupled to the computing device 702 having a wide variety of configurations to support a wide variety of functionality. In this example, the accessory device 714 includes one or more controls 716, which may be configured as press-sensitive keys, mechanically switched keys, buttons, and so forth.

The accessory device 714 is further illustrated as include one or more modules 718 that may be configured to support a variety of functionality. The one or more modules 718, for instance, may be configured to process analog and/or digital signals received from the controls 716 to determine whether an input was intended, determine whether an input is indicative of resting pressure, support authentication of the accessory device 714 for operation with the computing device 702, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable storage of information in contrast to mere signal transmission, carrier waves, or signals per se. Thus, computer-readable storage media does not include signals per se or signal-bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, microcontroller devices, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

Conclusion

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method implemented by a computing device, the method comprising:
   configuring an initial power contract for power exchange between an accessory device and the computing device based at least on initial power contract settings associated with the accessory device;
   determining that a change in power exchange conditions between the computing device and the accessory device has been detected, prompting modification of the initial power contract;
   modifying the initial power contract settings to generate a temporary power contract that reflects the modification based at least on the change in the power exchange conditions;
   initiating a user interface prompt that displays a request for a response input to retain the modification; and
   generating a modified power exchange contract by persisting the modification to the initial power contract settings based at least on the response input.

2. The method as recited in claim 1, further comprising detecting connection of the accessory device via an accessory interface to the computing device.

3. The method as recited in claim 2, further comprising comparing identity data of the accessory device to known identities of authorized accessory devices.

4. The method as recited in claim 3, wherein the identity data includes credentials supplied by the accessory device, and said comparing comprises determining whether the credentials match known credentials for an authorized accessory device that is authorized for the power exchange with the computing device.

5. The method as recited in claim 4, wherein the credentials comprise a resistor value of a resistor associated with the accessory device.

6. The method as recited in claim 1, further comprising monitoring to detect an update message communicated by the accessory device, the update message indicating the change in the power exchange conditions between the computing device and the accessory device.

7. The method as recited in claim 1, wherein the power exchange conditions include power loads associated with one or more peripheral devices connected to the accessory device.

8. The method as recited in claim 7, wherein the accessory device comprises a docking station configured to facilitate connection of the one or more peripheral devices to the computing device.

9. The method as recited in claim 1, wherein the initial power contract settings include a power exchange direction and current limits.

10. The method as recited in claim 1, wherein the computing device is a host computing device, and the power exchange comprises supplying power to the accessory device.

11. A computing device, comprising:
a memory configured to maintain an initial power contract for power exchange between an accessory device and the computing device based at least on initial power contract settings associated with the accessory device; and
one or more microcontrollers configured to execute a power controller, wherein the power controller is adapted to:
determine that a change in power exchange conditions between the computing device and the accessory device have been detected, prompting modification of the initial power contract;
modify the initial power contract settings to generate a temporary power contract that reflects the modification based at least on the change in the power exchange conditions; and
generate a modified power exchange contract by persisting the prompted modification to the initial power contract settings.

12. The computing device as recited in claim 11, wherein the power controller is adapted to compare identity data of the accessory device to known identities of authorized accessory devices.

13. The computing device as recited in claim 12, wherein the identity data includes credentials supplied by the accessory device, and the power controller is adapted to determine whether the credentials match known credentials for an authorized accessory device that is authorized for the power exchange with the computing device.

14. The computing device as recited in claim 11, wherein the accessory device includes a peripheral device hub, and the change in the power exchange conditions includes a change in a number of peripheral devices attached to the peripheral device hub.

15. The computing device as recited in claim 11, wherein the power exchange conditions include power loads associated with one or more peripheral devices connected to the accessory device.

16. The computing device as recited in claim 11, wherein the accessory device is an external battery device and the power exchange comprises supplying power to the computing device by the accessory device.

17. The computing device as recited in claim 11, wherein the power exchange conditions include relative states of charge, power loads, and power source availability.

18. A system, comprising:
a docking station with an accessory interface to an accessory device;
a computing device configured for connection with the accessory device via the accessory interface of the docking station;
a memory configured to maintain a data structure of power contract settings associated with accessory devices, the power contract settings including at least a power exchange direction and current limits; and
a power controller configured to:
detect connections of the computing device and the accessory device to the docking station via the accessory interface;
obtain the power contract settings associated with the accessory device from the data structure;
initiate an active power contract for power exchange between the computing device and the accessory device via the docking station based at least on the power contract settings associated with the accessory device;
detect a change in power exchange conditions between the computing device and the accessory device, prompting modification of the active power contract; and
modify the data structure to reflect modified power contract settings associated with the accessory device.

19. The system as recited in claim 18, further comprising one or more peripheral devices, and wherein the power exchange conditions include at least a power load supplied by the docking station to power the one or more peripheral devices.

20. The system as recited in claim 18, wherein the power exchange conditions include at least an amount of power available via external power supply to power the computing device and the accessory device via the docking station.

* * * * *